(No Model.) 10 Sheets—Sheet 1.

J. E. LEADLEY.
PROCESS OF AND APPARATUS FOR MANUFACTURING GAS.

No. 289,279. Patented Nov. 27, 1883.

(No Model.)           10 Sheets—Sheet 2.

J. E. LEADLEY.
PROCESS OF AND APPARATUS FOR MANUFACTURING GAS.

No. 289,279.                   Patented Nov. 27, 1883.

WITNESSES
W. E. Bowen
Geo. H. Harvey

INVENTOR
James E. Leadley
per O. E. Duff
Attorney (No Model.) 10 Sheets—Sheet 6.

J. E. LEADLEY.
PROCESS OF AND APPARATUS FOR MANUFACTURING GAS.

No. 289,279. Patented Nov. 27, 1883.

WITNESSES
W E Bowen
Geo H Harvey

INVENTOR.
James E Leadley
per O E Duffy
Attorney

(No Model.)

J. E. LEADLEY.
PROCESS OF AND APPARATUS FOR MANUFACTURING GAS.

No. 289,279.

Patented Nov. 27, 1883.

WITNESSES
Chas. R. Burr
Geo. H. Harvey

INVENTOR
James E. Leadley
per O. E. Duffy
Attorney (No Model.) 10 Sheets—Sheet 9.
J. E. LEADLEY.
PROCESS OF AND APPARATUS FOR MANUFACTURING GAS.

No. 289,279. Patented Nov. 27, 1883.

WITNESSES
Chas. R. Burr
W. E. Bowen

INVENTOR
James E. Leadley
per O. E. Duffy
Attorney

N. PETERS. Photo-Lithographer, Washington, D. C.

(No Model.) 10 Sheets—Sheet 10.

J. E. LEADLEY.
PROCESS OF AND APPARATUS FOR MANUFACTURING GAS.

No. 289,279. Patented Nov. 27, 1883.

UNITED STATES PATENT OFFICE.

JAMES E. LEADLEY, OF CAMDEN, NEW JERSEY, ASSIGNOR OF ONE-HALF TO JOHN HANLON, OF NEW YORK, N. Y.

PROCESS OF AND APPARATUS FOR MANUFACTURING GAS.

SPECIFICATION forming part of Letters Patent No. 289,279, dated November 27, 1883.

Application filed May 4, 1883. (No model.)

*To all whom it may concern:*

Be it known that I, JAMES E. LEADLEY, of Camden, in the county of Camden and State of New Jersey, have invented certain new and useful Improvements in Process of and Apparatus for Manufacturing Gas; and I do hereby declare that the following is a full, clear, and exact description of my invention, which will enable others skilled in the art to which it appertains to make and use the same, reference being had to the accompanying drawings, and to the letters of reference marked thereon, which form part of this specification.

This invention relates to the production of illuminating and heating gas by the decomposition of steam in contact with incandescent carbonaceous fuel, the distillation of bituminous coal by direct contact with heated fuel, the distillation and decomposition of hydrocarbon oil mingled with generator or water gas in retorts, and by the combining and fixing of the various gases and vapors in a fixing-chamber to form a homogeneous gas for illuminating or heating purposes, as desired.

In carrying out my invention, the fuel—preferably anthracite coal or coke—is raised to incandescence by blasts of air, and the resulting gaseous products are caused to impinge upon retorts in the top of the generating-furnace, and are then conducted into a fixing-chamber, where their complete combustion is caused by a blast of air, and the resulting heat stored in refractory material filling the fixing-chamber, and the waste products of combustion are finally conducted off through the stack. The fuel having been highly heated, the air-blast is shut off and steam is admitted into and decomposed in the hot fuel, resulting in the production of hydrogen and carbonic oxide, which rise through the fuel above. About the time or before the steam is admitted to the fuel, fresh charges of bituminous coal (one or more) are dropped upon the top of the hot fuel, by which the rich carbureted hydrogen gas is distilled. The light hydrogen and carbonic oxide rising from the hot bed of fuel below aid very materially in carrying off the rich gases from the fresh coal and conveying them to the fixing-chamber. The retorts in the top of the generator are now sufficiently heated to produce gas from oil, and immediately after the admission of steam to the fuel a portion of the resulting gas is passed from the generating-furnace, together with small streams of oil from separate pipes, into the side retorts, from which the mingled vapors and gas pass through a central retort, and thence into the fixing-chamber, into which the main portion of the gas resulting from decomposed steam and fresh charge of coal are also admitted from the furnace-generator. In this fixing-chamber the gases from the various sources are combined and fixed in the form of a homogeneous gas, which is conducted into the hydraulic main, and thence to the purifiers and storage-holder, or to any place of immediate use, as desired. The charge of coal having been distilled and reduced to coke, and the temperature of the bed of fuel having been reduced too low for properly decomposing steam, it is shut off and the air-blast again applied till the fuel is again raised to an incandescent state, the retorts heated, and the fixing-chamber heated. Then the operation of making gas as above explained is repeated.

The details of the operation will be more fully defined after a description of the apparatus, and the process constituting my particular invention herein will be pointed out in the claims. The parts of the apparatus and the combinations thereof constituting my invention herein will also be defined in the claims.

Having set forth the nature of my invention and given a general statement of the process, I will now describe particularly the construction and arrangement of the apparatus for carrying out the process.

The apparatus is illustrated in the accompanying drawings, in which.

In the following description the same letters of reference designate like parts in all the figures of the drawings.

Figure 1:
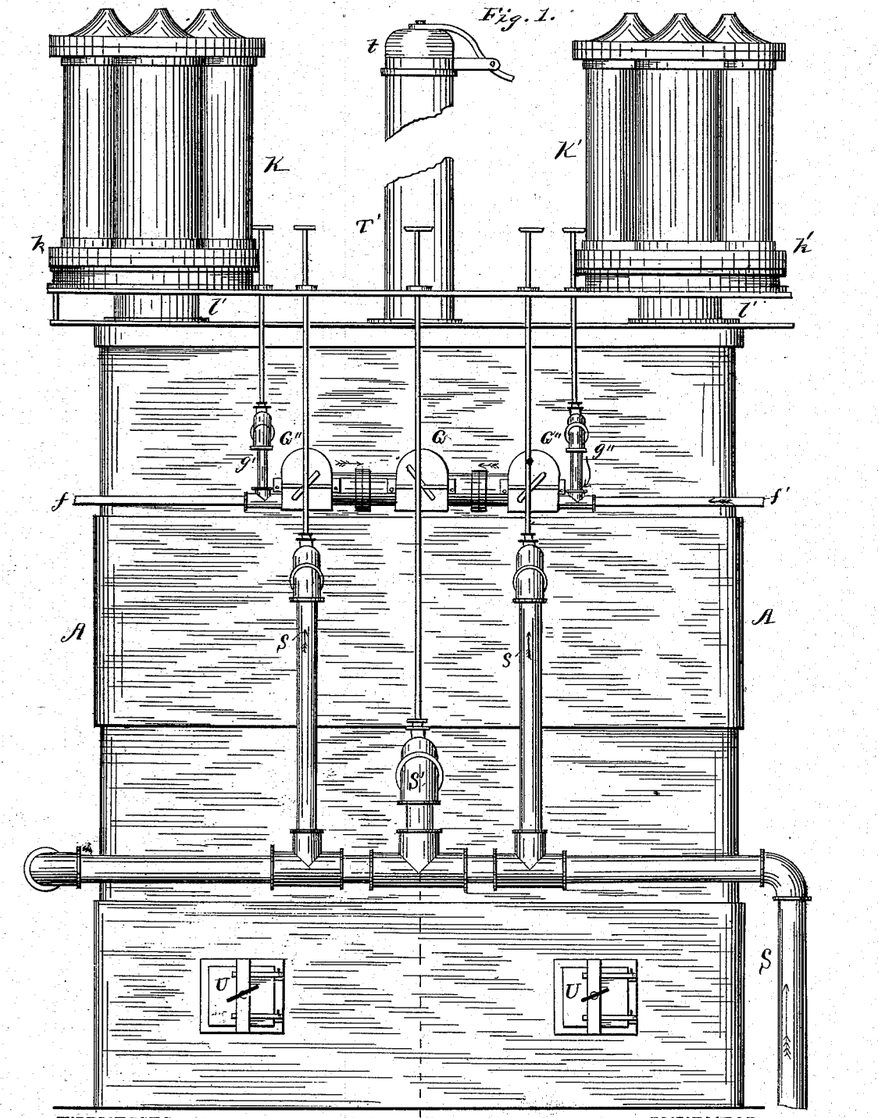
Figure 1 represents a front elevation of the generating-furnace and the charging-cylinders on top.
Figure 2:
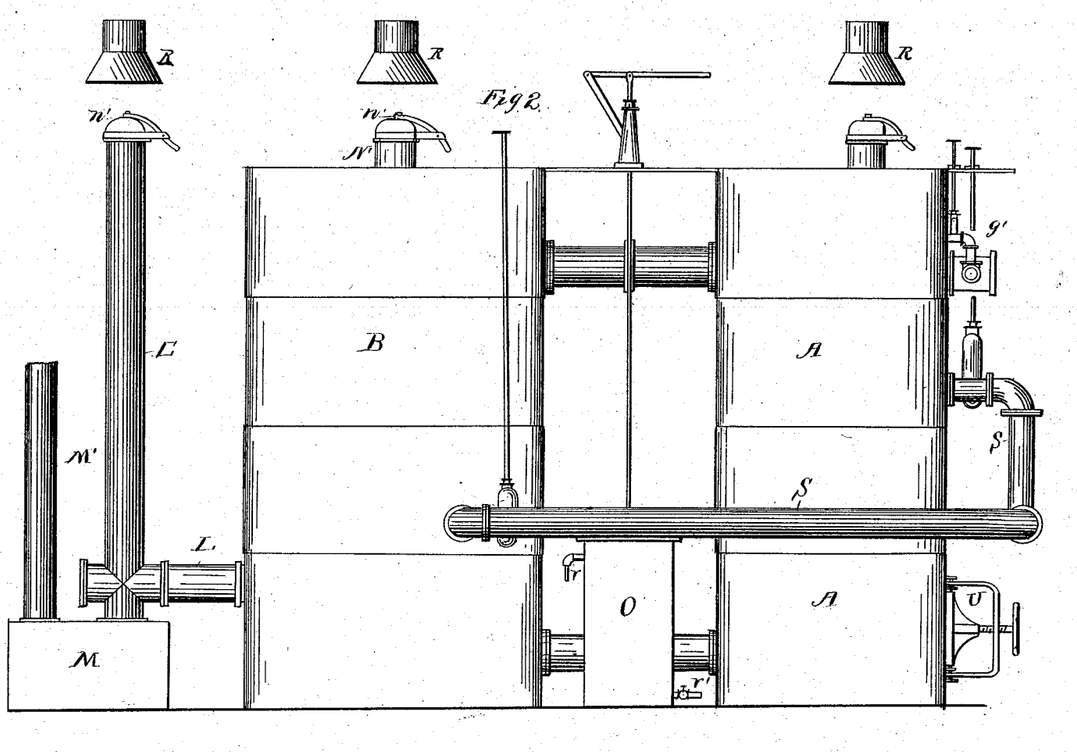
Fig. 2 represents a side elevation of the generator and fixing-chamber.

The generating-furnace A and the fixing-chamber B are constructed of fire-brick with surrounding casings of riveted boiler-iron, a space being left between the casing and brickwork for containing a packing of non-conducting material. The generating-furnace A has in its center, extending from front to back and from its base to about half its height, a hollow brick wall, C, containing baffle-plates c, extending alternately from the front and back wall nearly across the intervening space, forming a zigzag passage. This constitutes the air-heater, (see Figs. 3 and 4,) and has at the base the flues c' c', leading into the ash-pits D D', at the top of which are placed the grates d d'. The generator is thus divided into two fuel-chambers, E E', freely communicating at the top. Steam-pipes e e' enter the fuel-chambers near their bases. The air-pipe S and branch S', Fig. 1, supply air to the top of the heater C, which, after being heated, is admitted into the ash-boxes below the grates, and the branches s s' supply air above the fuel for burning the gaseous products when heating up. The main pipe S also extends to the fixing-chamber B, Fig. 2, for supplying air to support combustion while heating up such chamber.

Figure 3:
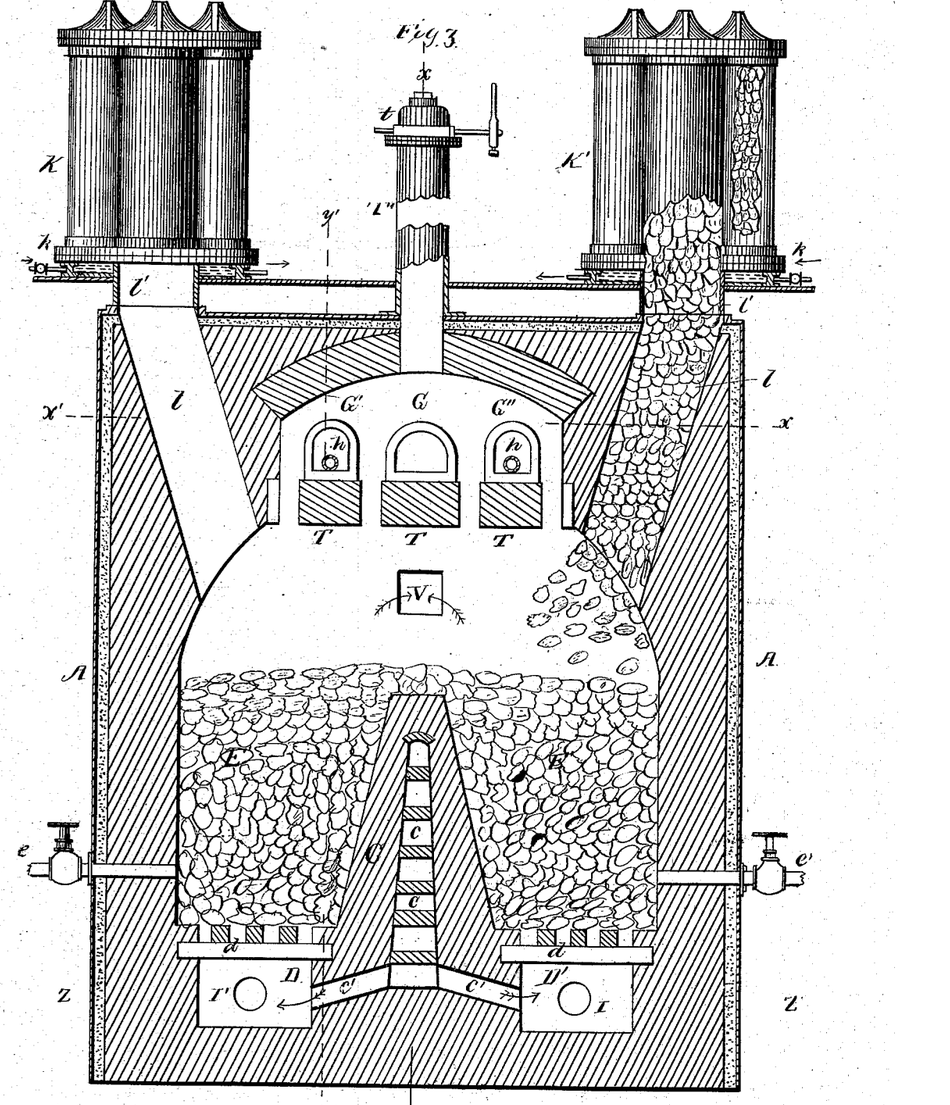
Fig. 3 represents a vertical cross-section of the furnace and retorts on the line *y y*, Figs. 4 and 7.
Figure 4:
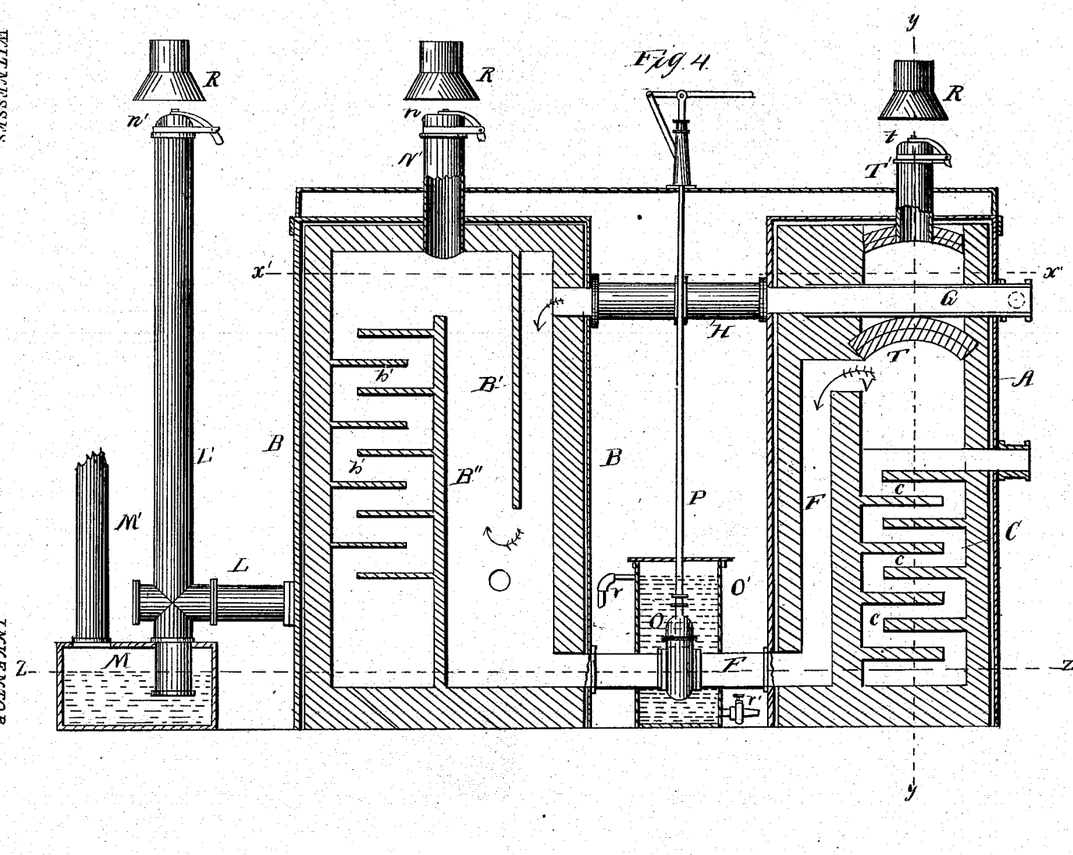
Fig. 4 represents a vertical central longitudinal section of the furnace, fixing-chamber, and hydraulic seal-box on the line *x x*, Figs. 1 and 3.
Figure 5:
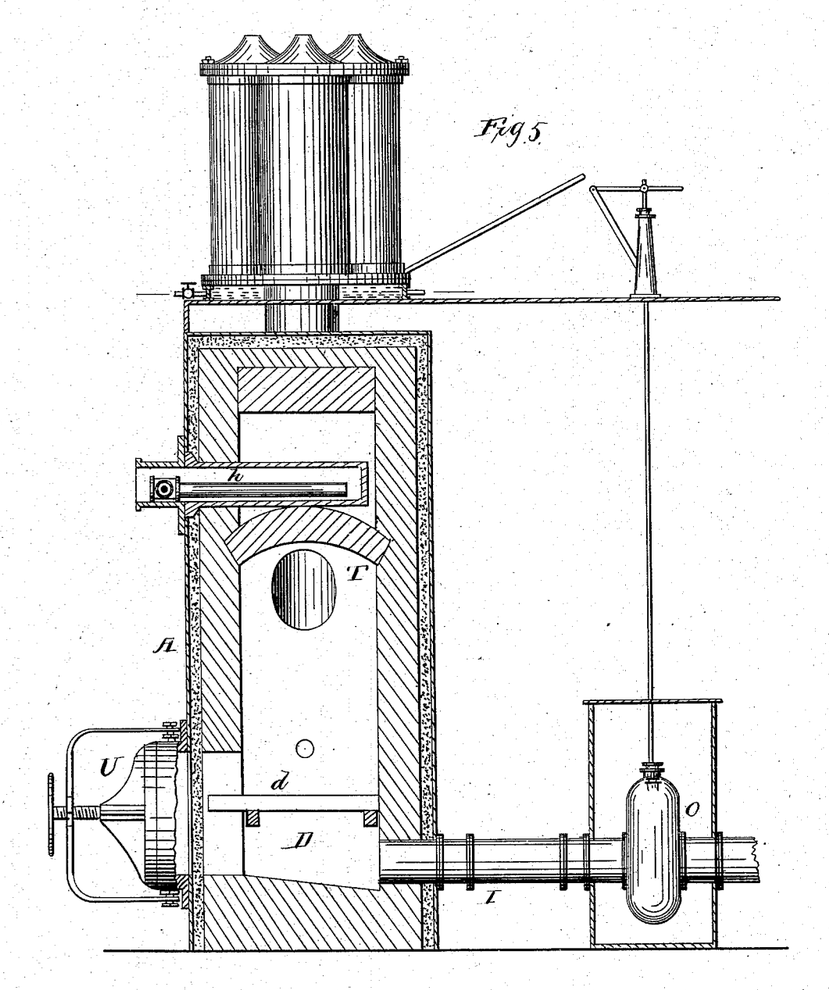
Fig. 5 represents a vertical section through the generator on the line *y' y'*, Fig. 3.
Figure 6:
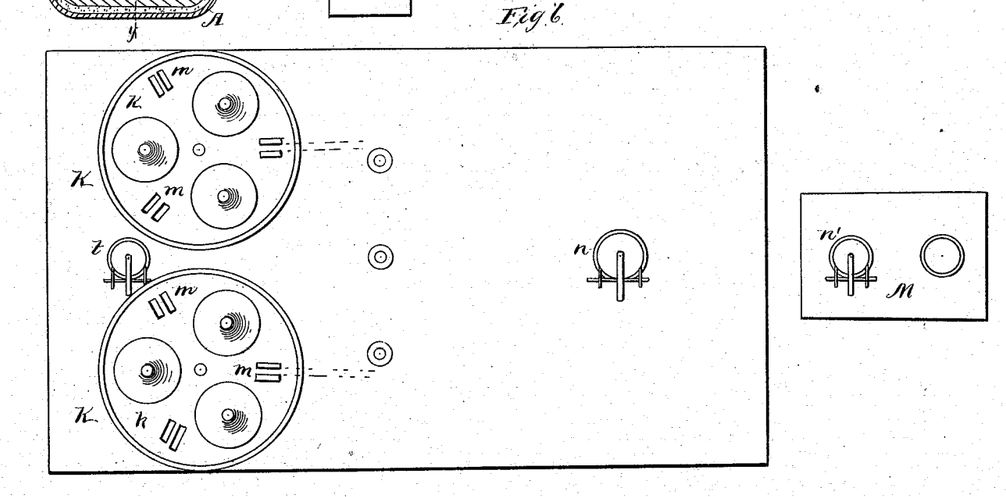
Fig. 6 is a top plan view of the structure.
Figure 7:
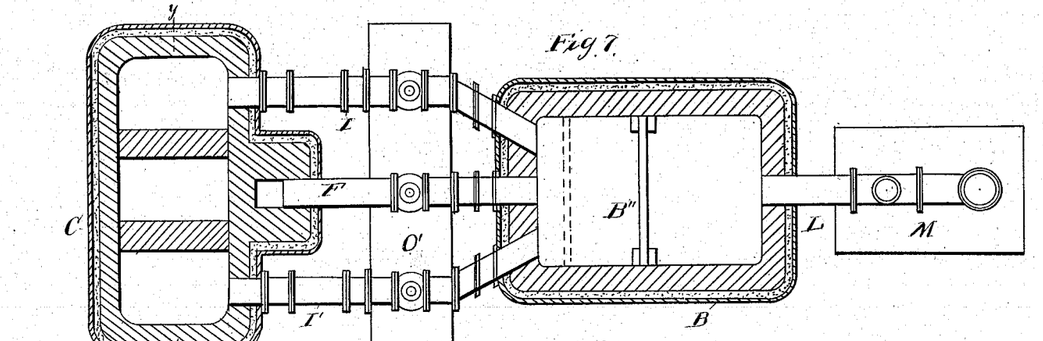
Fig. 7 represents a horizontal section of the generating-furnace and superheating or fixing chamber on the line z z, Figs. 3 and 4, on a smaller scale.
Figure 8:
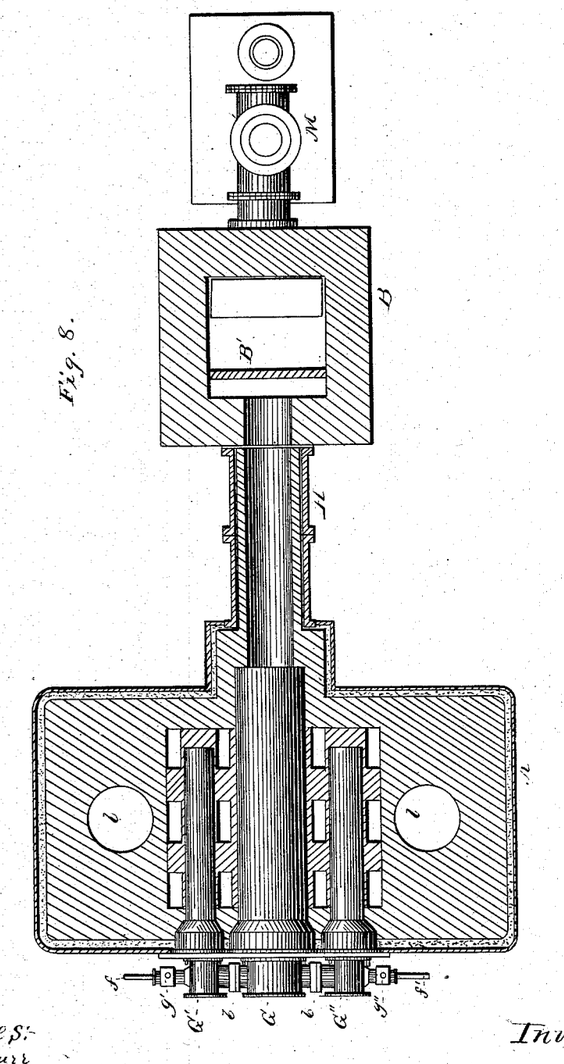
Fig. 8 represents a horizontal section of the generating-furnace above the retorts and of the fixing-chamber.
Figure 9:
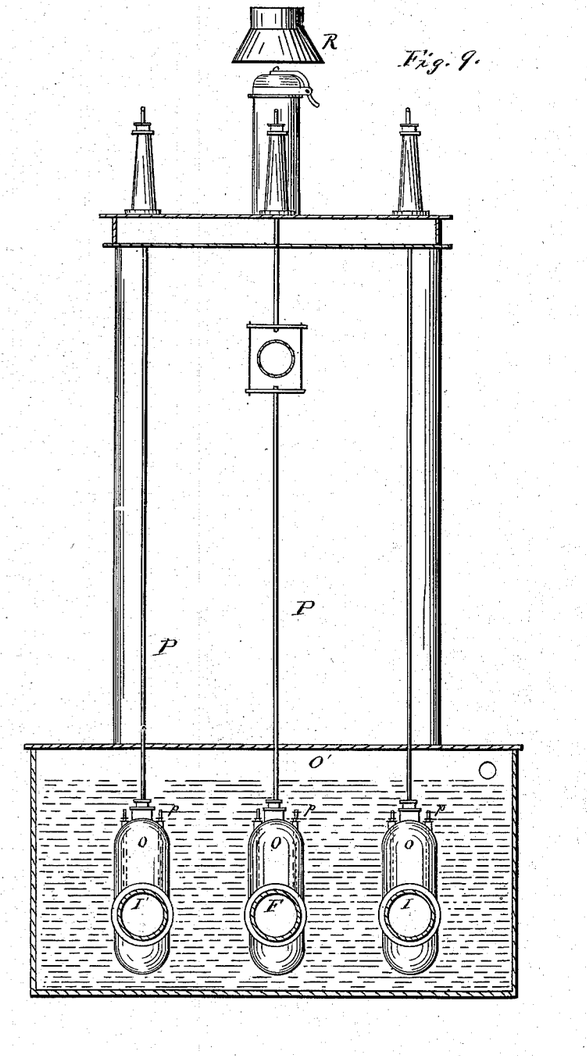
Fig. 9 is a sectional view of the water-box containing the valves, and showing the gas-pipes in cross-section.

The brick arches T, Figs. 3, 4, and 5, are built across from the front to the rear wall near the top of the generating-chamber, for supporting the retorts G, G', and G''. The side retorts, G' G'', are the oil-vaporizers, and have connecting with their front ends the oil-pipes f f' and the gas-supply pipes g' g'', also connecting with the interior of the generating-furnace. The oil and gas pipes unite with a single pipe, h, extending to near the rear end of each retort, where the mingled oil-vapor and highly-heated gas are discharged. Short pipes b connect the side retorts with the center retort, and the center retort connects by the pipe H with the superheater B. (See Figs. 4 and 8.) The opening V leads into the flue F, which conducts gas from the generator to the base of the superheater. The gas-flues I I' connect the base of the generator below the grates with the superheater, as shown in Figs. 5 and 7. A stack, T', having a tight-fitting lid, t, rising from the top of the generator, conveys away the products of combustion when desired.

Figure 10:
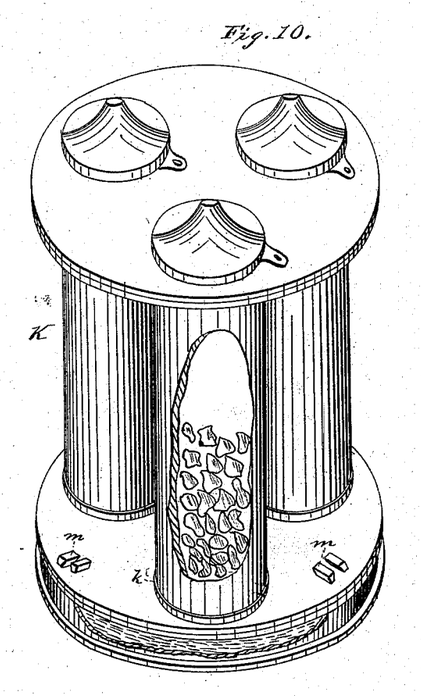
Fig. 10 represents a perspective view of the charging or feeding cylinders with parts broken away for showing the coal in one of the cylinders and for showing the water-cooled base.
Figure 11:
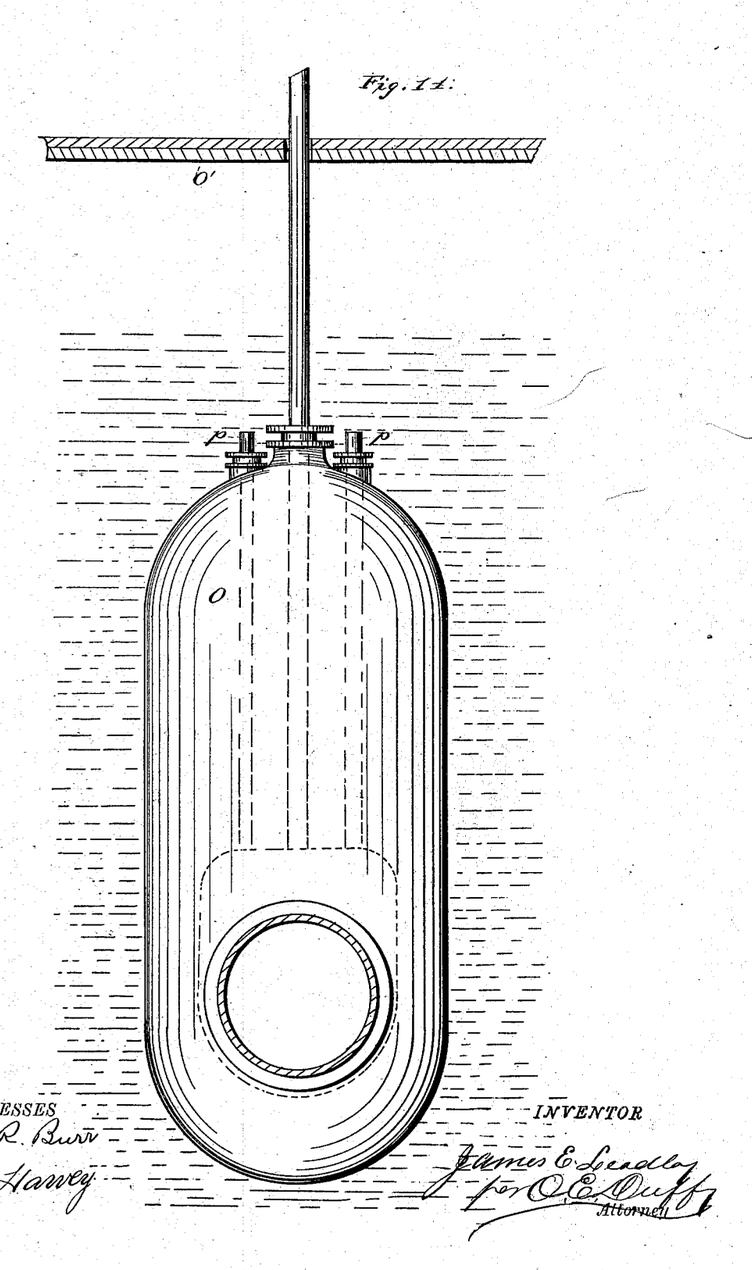
Fig. 11 is an enlarged view of a valve-casing.
Figure 12:
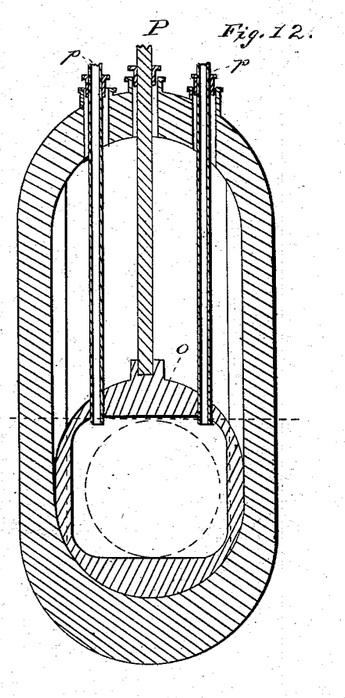
Fig. 12 is a vertical sectional view of a valve-casing, valve, and water-pipes extending to the hollow valve.
Figure 13:
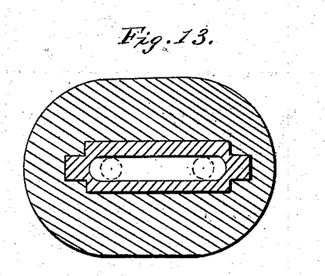
Fig. 13 is a transverse section of the casing and hollow valve.

The charging-cylinders K K' are placed on the staging above the generator. They are secured to a revolving pivoted plate, k k', at the bottom, having openings through it at the junction with the cylinders, and this plate turns upon a pivot secured in a plate below, which is also provided with an opening directly above the chute l of the generator. The base of the charging-cylinder is provided with a water-chamber having inlet and outlet water-pipes for keeping the cylinders sufficiently cool to prevent any distillation of the coal. A short pipe, l', connects the top plate of the water-chamber with the chute l. The pivoted plate k has cast upon its upper surface lugs forming sockets m, into which a bar may be inserted for turning the cylinders into position over the chute l. (See Figs. 3 and 10.) Each cylinder has a lid.

The fixing-chamber B is provided with the vertical suspended partition B' and standing partition B'', and with the baffle-plates b', of refractory material, projecting into the space between the partition B'' and the outer wall of the chamber, for affording sufficient heat-absorbing surface and causing the gases to be fixed to take a circuitous course in passing to the seal-box or main. The waste products of combustion which have been used in heating the fixing-chamber pass out at the bottom through pipe L and out of the stack L', its cap or lid n' being open and the lower end being sealed in the water of the box M, while the gases to be stored are caused to pass into the box M through the water, and to the purifier and storage-holder (not shown) through the pipe M', the lid n' of stack L' being at that time closed. Waste products of combustion may be passed directly from the top of the fixing-chamber through the stack N by opening its lid n.

The gas-eduction pipes F I I', leading from the base of the generating-chamber, are provided with water-cooled valves O, surrounded by a water-box, O'. The slide or gate o of the valve is made hollow, and its chamber has connecting with it two open-ended pipes, p, passing through the valve-casing and opening into the water-box, for permitting a circulation of water through the hollow valve for keeping it properly cooled. Tight joints are made between the pipes p and the valve-casing by stuffing-boxes and glands for permitting the pipes to slide as the valve is raised or lowered. The stems P of the valves extend above the staging where the operating-levers are applied. The water-box O' is provided with an inlet water-cock, r', and an overflow-pipe, r. Funnels R are placed above the stacks for conducting away the smoke. Doors U are fitted to the front of the generating-furnace, and open into the ash-pits and fuel-chambers. The air, steam, and oil pipes are fitted with suitable valves.

In operating my apparatus fires are kindled on the grates and the chambers are charged with fuel—anthracite coal or coke—and the air-blast is admitted through pipe S and its branches and air-heater C into the ash-pits D D', the doors thereof being closed and the cap $n'$ of stack L' being open. The air-blast is continued till the bodies of fuel are brought to an incandescent state, the hot gaseous products being at the same time conducted into the fixing-chamber, where complete combustion takes place by the admission of air, and where the resulting heat is stored in the refractory material, and the waste products of combustion are conducted away by smoke-stack L'. The bed of fuel and the fixing-chamber having been heated to the desired temperature, the air-blast is shut off and the lid $n'$ closed, and the valve of pipe F is left open. Steam is now admitted into the hot fuel by pipe $e\ e'$, and at about the same time, or before a charge of bituminous coal is dropped upon the top of the bed of fuel, a small charge may be supplied to each side of the generator, then the valves in the gas-pipe $g\ g'$ are opened, admitting gas from the generator-chamber into the retorts G' G'', and the oil-pipes are opened, admitting oil into the pipes $h$, which is carried along by the highly-heated gas and vaporized, and the vapors are discharged into the rear ends of the retorts. The steam admitted is decomposed into hydrogen and carbonic oxide, which, rising through the fresh charge of coal, now in a state of distillation, carry off the rich carbureted hydrogen vapors and gases and pass with them into the retorts and directly into the fixing-chamber B. The highly-heated gas conducted into the vaporizing-retorts aids in vaporizing the oil and carrying the vapors forward through the central retort and into the fixing-chamber. The gases and vapors are combined and converted into a fixed homogeneous gas in the fixing-chamber, which is passed through the hydraulic seal-box and stand-pipe to the purifiers and storage-holder. More or less oil may be admitted to the retorts to enrich the gas, as desired. After the charge of coal is distilled and coked, the eduction-pipe F is closed by its valve, and the valve of pipe I', leading from ash-pit D' to the fixing-chamber, is opened and the valve of steam-pipe $e'$ is closed. Steam is now passed into the bed of fuel E, and the products rising from this bed are forced down through the bed of fuel E'. By this method any steam escaping decomposition in the first bed of fuel is decomposed in the second bed, and any carbonic acid arising from the first bed is changed into carbonic oxide by passage through the second bed of fuel. This method of operating also causes a pressure of gas in the top of the generating-chamber, which better heats the retorts and causes a good flow of highly-heated gas into the retorts to assist in vaporizing and atomizing the oil, and in carrying the vapors forward into the fixing-chamber. Of course the current of steam and gas could be conducted in the reverse direction into and out of the generating-chamber, and the direction of the current may be determined by the side or chamber of the generator which has been last charged with coal. The manufacture of gas is continued till the temperature of the fuel, the retorts, and the fixing-chamber is reduced too low, when the steam and oil are shut off and the valves are properly arranged for heating the fixing-chamber, and the air-blast is admitted into the fuel. After the beds of fuel, the retorts, and the fixing-chamber are properly heated, the blast is shut off and the parts again arranged for making gas, and the production of gas is repeated, as above explained.

It will be understood that when it is desired to drop a charge of coal into the generator one of the cylinders containing a charge is turned to register with the chute of the generator, when the charge will slide into place. The cylinders, after having been discharged and turned away from the chute, are again filled with coal.

In my process the bituminous coal is conveniently coked, as but a small charge thereof is dropped upon the hot bed of fuel at any one time, and the rich gas and vapor evolved are all saved and serve to enrich the hydrogen of the water-gas. No tar is produced, for the reason that all the rich vapors are combined with the water-gas and converted into non-condensable gas in the fixing-chamber. Hot water-gas being admitted to the oil-retorts assists in vaporizing and atomizing the oil and carrying the vapors forward, and thus prevents them from being deposited as hard carbon on the surfaces of the retorts, and the water-gas is thus enriched and fitted for illuminating purposes. By vaporizing the oil in the retorts it is not burned and destroyed, as it would be if admitted directly upon the hot fuel in the generator.

Having described my invention, what I claim, and desire to secure by Letters Patent, is—

1. The process of manufacturing gas, which consists in raising a body or bodies of fuel to an incandescent temperature by blasts of air, and burning the resulting gaseous products, and storing the heat in the fixing-chamber containing refractory material, and also heating oil-retorts, then dropping a charge of bituminous coal upon the bed of hot fuel and distilling it by the direct heat, and at the same time decomposing steam in the bed of incandescent fuel and passing the resulting gases up through the distilling coal, conducting a portion of the gas to the oil-retorts and thereby carrying the oil into the retort, and the vapors through the retorts into the fixing-chamber, and finally combining the water-gas, the coal gas, and the oil-gas, and converting them into a fixed homogeneous gas in the heated fixing-chamber.

2. The single-chambered decomposing and generating furnace having two ash-pits, in combination with the hollow wall C, rising a short distance into the decomposing-chamber, and having baffle-plates $c$, forming a zigzag air-heating passage, and air-flues $c'$ $c'$, connecting with the ash-pits, the air-blast pipe connecting with the top of the air-passage, and a gas-escape flue, as described.

3. The generating-furnace having air and steam inlet pipes at or near its base, and the connected oil-vaporizing retorts placed in its upper part, in combination with a fixing-chamber and pipes connecting the generating-chamber and the retorts with the fixing-chamber.

4. The connected retorts placed in the top of the generating-chamber, in combination with the pipes $g'$ $g''$, connecting the chamber with the side retorts, and the oil-supply pipe connecting with the gas-pipes entering the retorts.

5. The charging apparatus consisting of two or more cylinders secured to a revolving pivoted base-plate having openings corresponding to the cylinders, and a supporting-base having an opening and discharge-pipe, in combination with the generating-furnace having the chute $l$, connecting with the discharge-pipe of the charging-cylinders.

6. The charging apparatus consisting of the cylinders mounted on a revolving plate, as described, in combination with the hollow supporting-base having inlet and outlet water-pipes, and a discharge-chute leading into the furnace.

7. The generating-furnace having inlet air and steam pipes connecting with both sides thereof, in combination with a fixing-chamber, a gas-pipe, F, connecting the upper portion of the generator with the fixing-chamber, and the gas-flues I I', connecting the ash-pits of the generator with the fixing-chamber.

8. In combination with the generator and its eduction gas-pipes, the water-cooled valves having hollow slides or gates and circulating-tubes, connected as described, and the surrounding water-box.

9. The process of generating gas, which consists in charging bituminous coal into a heated generating-chamber containing two bodies of fuel at an incandescent heat, and thereby distilling the rich gas from the coal and reducing it to coke, then decomposing steam by passing it up through one body of the hot coke, and converting any carbonic acid in the resulting gases into carbonic oxide by passing such gases down through the other body of hot coke, and at the same time passing a portion of the hot gas to a heated retort, and thereby spraying oil into such retort and carrying forward the resulting vapors, preventing the formation of carbon, and finally combining and fixing all the resulting vapors and gases in a heated chamber, as described.

In testimony that I claim the foregoing as my own invention I affix my signature in presence of two witnesses.

JAS. E. LEADLEY.

Witnesses:
T. H. BOARDMAN,
JAMES M. CASSADY.